Jan. 31, 1961 C. C. BAUERLEIN 2,969,651
AUTOMATIC ICE MAKING APPARATUS
Filed June 27, 1958 4 Sheets-Sheet 2

Inventors
Carl C. Bauerlein

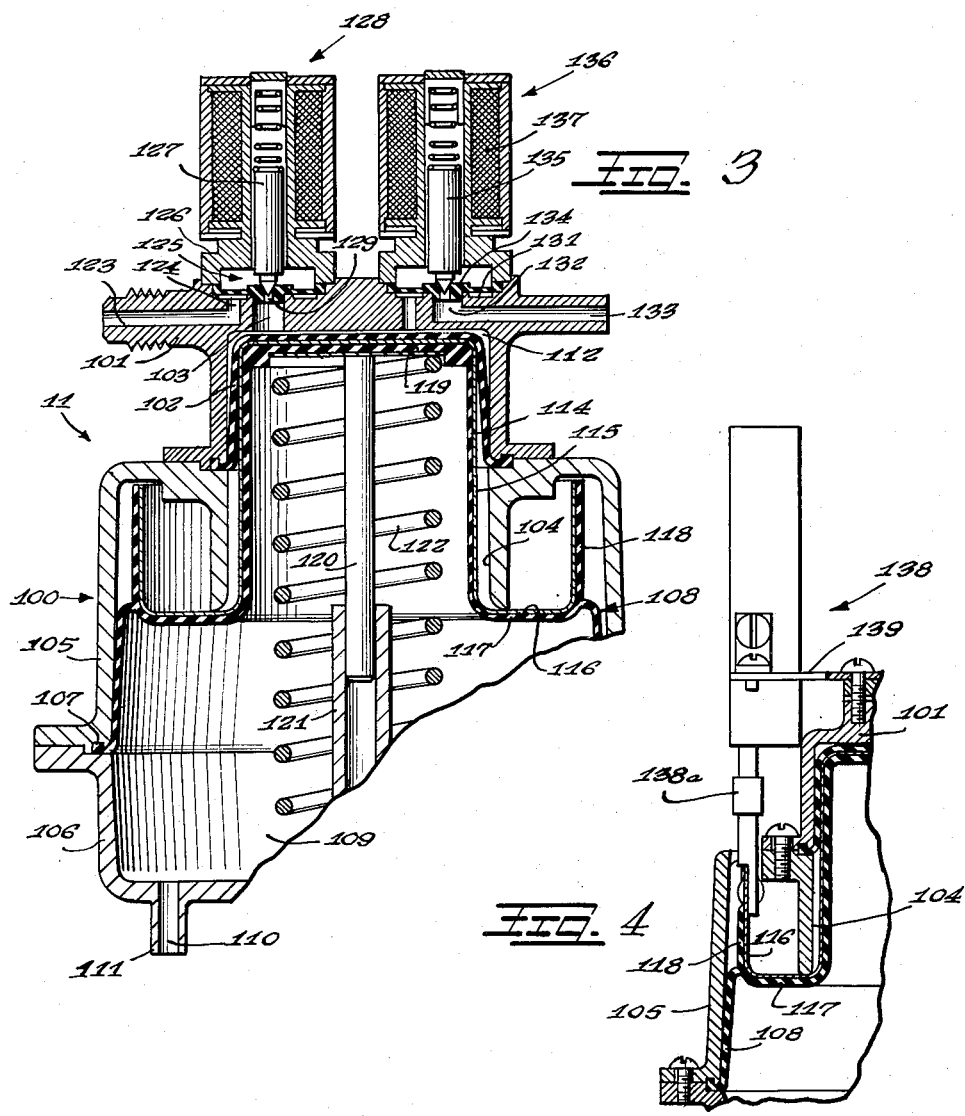

Jan. 31, 1961   C. C. BAUERLEIN   2,969,651
AUTOMATIC ICE MAKING APPARATUS
Filed June 27, 1958   4 Sheets-Sheet 4
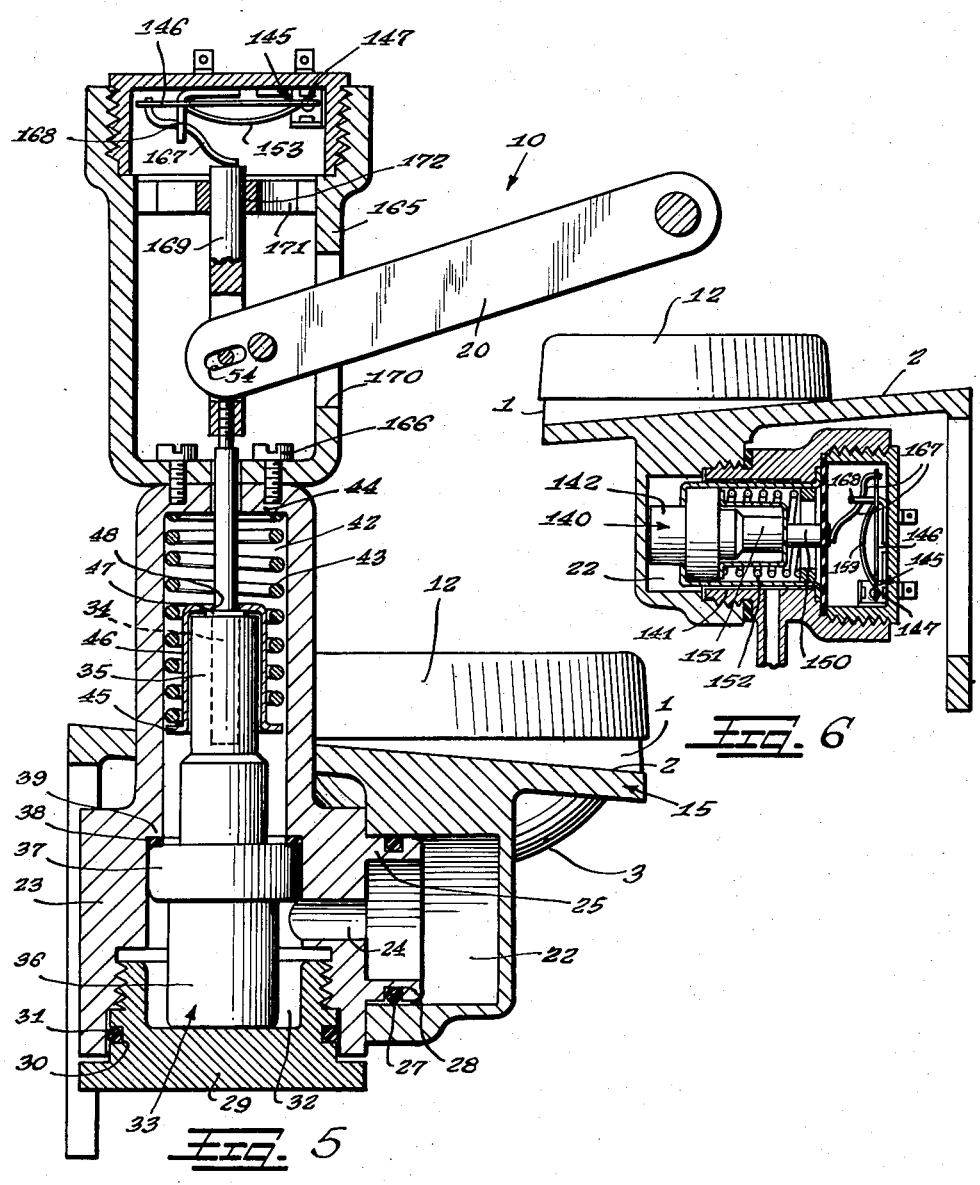
Inventors
Carl C. Bauerlein

United States Patent Office 2,969,651
Patented Jan. 31, 1961

2,969,651

AUTOMATIC ICE MAKING APPARATUS

Carl C. Bauerlein, Lincolnwood, Ill., assignor to The Dole Valve Company, Morton Grove, Ill., a corporation of Illinois Filed June 27, 1958, Ser. No. 744,997

13 Claims. (Cl. 62—135)

This invention relates to improvements in automatic ice makers and more particularly relates to improvements in ice makers adapted for use in household refrigerators in which water is frozen in flexible molds and in which frozen ice cubes are ejected therefrom by inversion of the molds.

Applicant has found it advantageous to provide a means associated with an ice making apparatus of the type above described for preventing the frozen cubes from sticking to the flexible molds when those molds are inverted. In this manner, when the molds are returned to their normal position within the mold cavities the adherence of any of the cubes to the flexible mold members will be prevented thus positively insuring that each of the cubes will fall from the inverted molds to the collection tray below.

The present invention contemplates the provision of a scavenger bar associated with such an ice making apparatus which may be automatically controlled under the cyclic control of the ice making apparatus wherein the bar is moved into engagement with any cubes that have not fallen from the flexible mold member after the molds have been inverted.

Applicant further contemplates that movement of the scavenger bar be effected by extensible movement of a power member or piston of a thermally responsive actuating unit which is placed in heat transfer relation with the fluid utilized to effect inversion of the molds.

Accordingly, it is a principal object of this invention to provide in an automatic ice maker of the type in which water is frozen in flexible molds and in which the mold members are thereafter inverted to eject the frozen cubes, a means for insuring that the frozen cubes will not stick to the flexible molds when those molds are inverted.

A further object of this invention is to provide a movable scavenger bar device which is responsive to the temperature of the fluid utilized to invert the flexible molds to move into engagement with any frozen cubes adhering to the inverted molds to prevent any cubes from sticking to the inverted molds to thereby insure that each frozen cube will move out of engagement with the inverted mold members.

Yet another object of this invention is to provide a mechanism associated with automatic ice makers in which water is frozen in the form of ice cubes in invertible flexible molds, for insuring that the frozen ice cubes will not stick to the inverted flexible molds upon the return thereof and in which the fluid of a hydraulic power system operating to invert the molds also acts to actuate the mechanism insuring freeing of the cubes from the molds upon the return of the flexible mold members.

Another object of the present invention is to provide an automatic ice maker in which flexible molds are inverted to eject the ice cubes therefrom, along with means for insuring the freeing of the ice cubes from the flexible molds when those molds are returned, said means being operative in response to the temperature of the fluid functioning to invert the molds.

A still further object of the present invention is to provide a scavenger bar associated with automatic ice makers in which water is frozen in the form of ice cubes in invertible flexible molds for pushing the frozen cubes from the returning flexible molds in which the scavenger bar is actuated by a thermally responsive element which is responsive to the temperature of the fluid used for inverting the molds, thus insuring that the scavenger will be actuated at the time when the flexible molds are in their inverted state.

These and other objects of the invention will become apparent from time to time as the following specification proceeds and with reference to the accompanying drawings wherein:

Figure 3 is a fragmentary vertical sectional view of the combination metering device and reservoir utilized in the illustrated ice making apparatus;

Figure 4 is a fragmentary sectional view of the combination metering device and reservoir illustrated in Figure 3 and showing a means for actuating a controlling micro switch;

Figure 2:
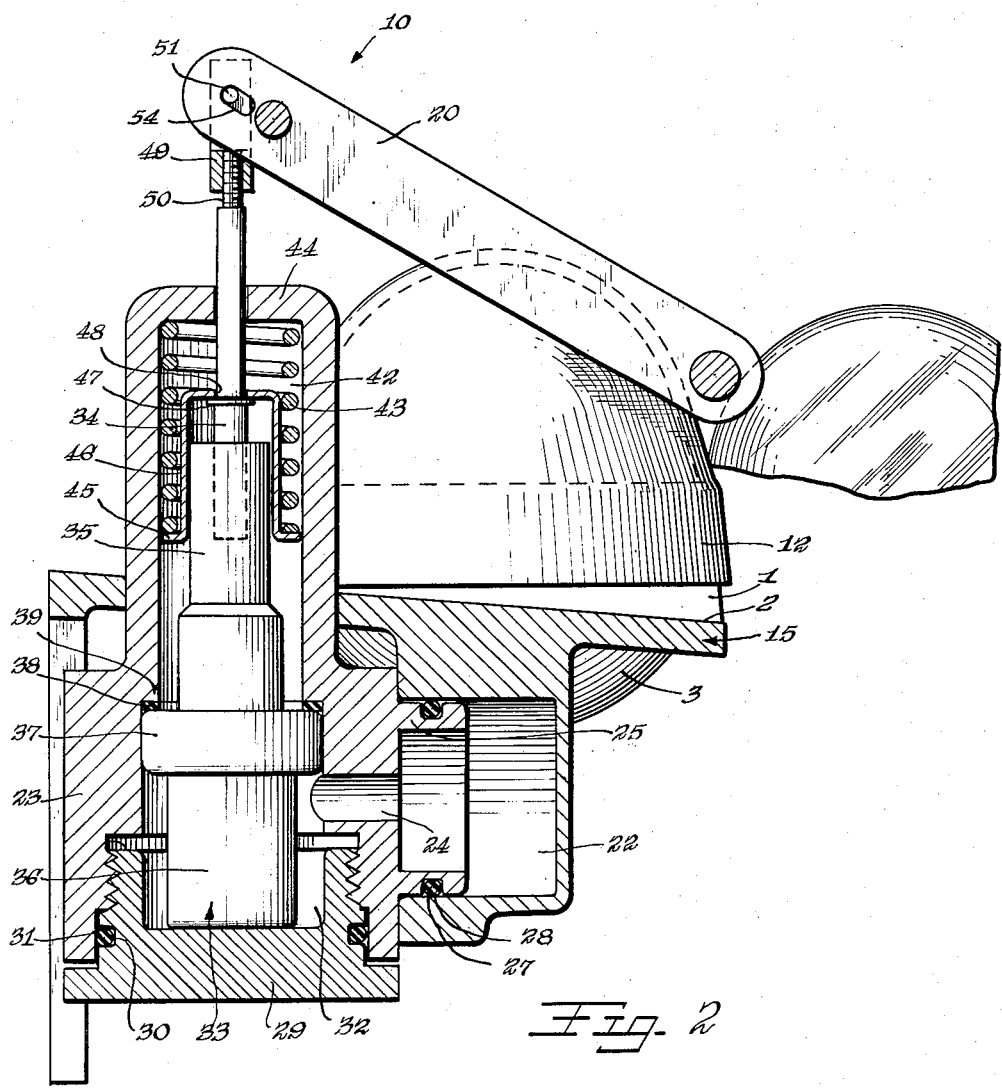
Figure 2 is a vertical sectional view taken through the scavenger bar and actuator housing showing some parts in section and others in side elevation.

Figure 5 is a vertical sectional view through the scavenger bar and actuator housing showing some parts in section and others in side elevation and showing a different embodiment of the invention from that illustrated in Figure 2; and Figure 6 is a fragmentary vertical sectional view taken through the ice cube tray showing the thermally responsive element and thermostatic switch operated thereby for initiating the ice cube ejecting operation.

In the embodiment of the invention illustrated in the drawings, there is shown a scavenger bar device 10 which, for illustrative purposes, is shown as being associated with an ice making apparatus such as is shown and described in the co-pending application No. 667,541 filed by Mullapudi M. Reddi and me on June 24, 1957, now Patent No. 2,918,803. The ice making apparatus as described in the above mentioned pending application includes a combination metering device and reservoir 11 which serves as a reservoir for ejector fluid used to invert flexible molds 12 and as a metering device for metering a measured volume of fluid to a fill delay container 13 which, in turn, dispenses liquid to the flexible molds 12 in the ice cube tray 15 as will hereinafter be more fully described.

The ice cube maker illustrated in the drawings is of the type in which water is frozen in flexible molds and in which the molds are subsequently inverted to eject the frozen water cubes therefrom by fluid pressure which is alternately supplied to the underside of the molds from the combination metering device and reservoir 11. The metering device and ejector fluid reservoir 11 comprises a container 100 which is shown as being in three sections including an upper section 101 having a liner 102 therein, conforming to the wall thereof when empty, and movable upon the supply of water at household pressures through an inlet port 103 to conform to an annular wall 104 depending from the top of an intermediate section 105 of the container 100.

The intermediate section 105 is similarly suitably connected to the lower cup-like section 106 of the container 100. The undersurface of the intermediate section 105 has a rib 107 of a second flexible liner 108 recessed therein and seals the liner to the lower section 106 by suitably clamping and screw means as is more clearly described in the above mentioned co-pending application. The interior of the measuring device and ejector fluid reservoir form between the liner 108 and the inner surface of the lower section 106 forms a reservoir 109 for ejector fluid for reasons which will hereinafter become apparent. An outlet 110 extends through the wall of the cup-like lower section 106 of the three part valve body and terminates in a connecting nipple 111 as fluid is admitted through the inlet 103, the chamber 112 of the flexible liner 102 is filled with fluid to move the liner inwardly along the wall of the upper section 101 to conform to the annular wall 104 of the intermediate section 105. It will thus be understood that if the reservoir 109 is substantially filled with ejector fluid, downward movement of the liners 102 and 108 will force ejector fluid out through the outlet 110 and then through a connecting tube 113 to the ice cube tray to invert the flexible molds 12 as will hereinafter be more clearly described in detail. The ejector fluid may, of course, be any neutral non-toxic fluid and preferably should be a fluid which will not freeze in the environment of the refrigerator.

The reduced diameter portion 114 of the liner 108 is shown as extending within a cup-like retainer 115, which may be made from metal and which serves to retain the reduced diameter portion 114 of the liner 108 from ballooning out when forcing ejector fluid through the outlet 110. The cup-like retainer 115 conforms to the form of the reduced diameter portion 114 and has an intermediate annular flange portion 116 extending along the flange or shouldered portion 117 of the liner 108. The retainer also has an annular wall 118 extending upwardly from the flanged portion 116 adjacent the outer margin of the annular shouldered portion 117.

The top wall of the reduced diameter portion 114 of the flexible liner 108 has a diaphragm plate 119 recessed therein, having a guide stem 120 welded or otherwise secured to the center thereof and slidably guided in a guide 121, extending upwardly from the bottom of the lower section 106. The guide stem 120 and the guide 121 are encircled by a return spring 122 seated at one end in the bottom of the lower section 45 and at its opposite end on the diaphragm plate 119.

The upper section 101 of the container 100 has an inlet 123 leading thereinto, having communication with an upwardly opening annular passageway 124, encircling the inlet port 103 into the measuring chamber. The annular passageway 124 is closed by a pressure operated diaphragm valve 125, sealed to the top of the section 101 as by a guide 126, for an armature 127 of an inlet solenoid 128. The valve 125 is a well known form of pressure operated solenoid controlled diaphragm valve and has a bleeder passageway leading therethrough to allow water to bleed to the top side of the valve 125 to maintain the valve closed, by the pressure of water thereon. Upon energization of the magnet coil within solenoid 128, the pilot port 129 within the diaphragm valve 125 will open, relieving pressure from the top side of the diaphragm and effecting opening of the diaphragm by pressure on the underside thereof as is well known in the art.

An outlet 130 leads through the top of the upper section 101 to an annular passageway 131 encircling an outlet port 132 having communication with an outlet 133 leading from the top section 101. The annular passageway 131 is encircled by a pressure operated solenoid controlled pilot valve 134, like the valve 125 hereinbefore explained. Opening of the valve 134 is controlled by an armature 135 of a solenoid 136, upon the energization of a magnet coil 137 of the solenoid.

The magnet coils are alternately energized to effect alternate opening of the valves 125 and 134 under the control of a double pull double throw switch 138 illustrated in Figure 4.

The switch 138 may be a well known form of micro or limit switch so need not herein be shown or described in detail. The switch is shown as being mounted on the top of the upper section 101 of the container 100 on a bracket 139. The switch 138 is operated by a link 138a secured to the upstanding annual wall 140 of the cup like retainer 116 conformable with the annular wall 118. The switch 138 has a movable switch arm therein normally in the intermediate open circuit position when the ejector reservoir is full and the measuring chamber is empty.

As illustrated in Figures 1, 2, 5 and 6 the ice cube tray 15 has a plurality of upwardly extending annular ribs 1 which are formed in the lateral surface 2 of the ice tray 15 and which are spaced from one another and which define a plurality of concave openings or wells 3. Each of the concave wells 3 is communicable through a port (not shown) with a transverse ejector fluid passageway 22 in the ice tray 15. Flexible hat shaped mold members 12 are fitted about the upstanding annular ribs 1 and are arranged to normally conform to the shape of the concave wells 3.

A thermal element 140 is shown in Figure 6 as being mounted within a fitting 141 and as having a casing 142 containing a fusible thermally expansible material. The casing 142 is positioned within the fluid passageway 22 in the ice tray 15 in heat transfer relation with respect to the freezing water in the molds 12 to sense the temperature thereof and to initiate an ice cube ejecting operation by the operation of the thermal element 140 as the water in the molds 12 freezes, as will hereinafter be more clearly described.

It will now become apparent that the valve 125 shown in Figure 3 is initially opened under the control of a thermostatic switch 145 illustrated in Figure 6 which is operated by the thermal element 140 to engage a movable switch arm 146 of the switch with a stationary contact 147 of the switch as the water in the molds 12 freezes. This will complete an energizing circuit to the magnet coil within the solenoid 128 and effect opening of the valve 125 to initiate filling of the measuring chamber 112. As the measuring chamber is being filled, the water pressure acting on the flexible liner 102 will force the liner and the liner 108 downwardly against the compression of a spring 122, forcing ejector fluid through the outlet 110. Downward movement of the liner 108 and cup like retainer 116 will effect operation of the switch 138 through the link 138a to complete a holding circuit to the magnet coil within the inlet solenoid 128. This will hold the magnet coil 128 energized as the ejector fluid flows about the casing 142 of the thermal element 140, thus heating the casing to effect opening of the thermostatic switch 145 as will hereinafter be more clearly described as the specification proceeds.

Downward movement of the liner 108 will, of course, volumetrically decrease the size of the ejector fluid reservoir 109 thus forcing the ejector fluid therein through the outlet 110, the connecting tube 113, the fluid passageway 22 within the ice cube tray 15, and the port (not shown) to the concave wells 3 on the underside of the flexible mold members 12 to invert the flexible molds to thereby effect ejection of the frozen cubes therein from the molds 12.

At the termination of the ejecting operation, the link 138a will be moved downwardly by downward movement of the retainer 116 which will effect movement of the movable switch arm within the switch 138 to simultaneously deenergize the magnet coil within the solenoid 128 to effect closing of the valve 125 and energize the magnet coil 137 to effect opening of the valve 134.

As the valve 134 opens, upon closing of the valve 125, the release of pressure from the measuring chamber 112 will accommodate the spring 122 to return the liners 102 and 108 to the position illustrated in Figure 3. This will draw ejector fluid from the concave cavities 3 and the passageway 22 in the ice tray 15 through the connecting tube 113 back to the ejector fluid reservoir 109 to return the molds 12 and simultaneously force water through the outlet 133 to the fill delay container 13 for subsequent discharge into a measuring trough 14. As the liners 102 and 108 return to the position illustrated in Fig. 3, retainer 116 will operate switch 138 to deenergize magnet coil 137 and effect closing of valve 134. Hence, as the water in the molds 12 freezes, and the ambient temperature about the casing 142 of the thermal element 140 drops to substantially 25° F. or lower, the power member 150 of the thermal element 140 will have retractably moved within the cylinder 151 thereof by the bias of a return spring 152 a distance sufficient to effect movement of the switch arm 146 into engagement with the stationary contact 147 by the biasing force of an overcenter spring 153 connected to the outer free end of the switch arm 146 to effect opening of the inlet valve 125 as is more clearly described in detail in my co-pending application hereinbefore referred to. This, in turn, will force ejector fluid from the ejector reservoir 109 by the pressure of water filling the measuring chamber 112 to invert the molds 12 to eject ice cubes therefrom as has been hereinbefore now described.

Figure 1:
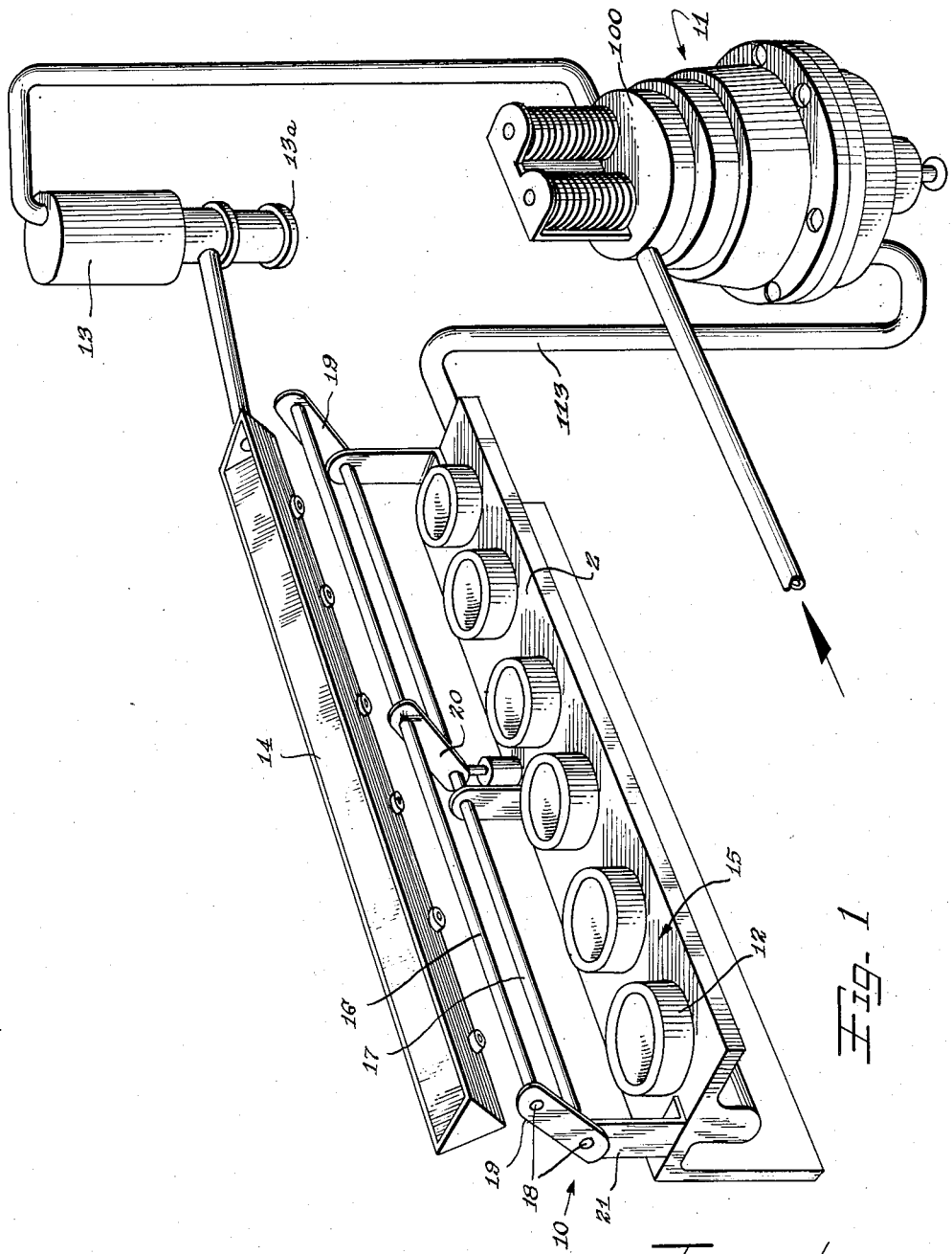
Figure 1 is a pictorial view of a scavenger bar installed in accordance with the principles of the present invention on an automatic ice maker of the type in which water is frozen in flexible molds and in which the ice cubes are ejected therefrom by inversion of the molds.

The fill delay container 13 may be a siphon device as disclosed in my aforementioned copending application, or it may be a container as shown in Fig. 1 with an outlet controlled by any well known form of solenoid operated valve, the particular form of which is no part of my present invention, so is not herein shown or described in detail. It is contemplated that any valve spring biased to the open position and operated to a closed position by energization of a solenoid may be used. Thus, energization of the solenoid 13a connected to the valve within the container 13 at the same time coil 137 is energized closes the outlet of container 13 during the time water is delivered thereto from measuring chamber 112, and deenergization of the solenoid 13a at the same time coil 137 is deenergized allows the valve to open for delivery of the measured amount of water to the trough 14. In this manner, it is assured that all the molds 12 are returned to their cup-like position before delivery of water thereto from the trough 14.

The flexible molds 12 which are illustrated and referred to in this specification may be formed from rubber or a like stretchable material and are so formed, as shown in my co-pending application hereinbefore referred to, so that inversion thereof is arranged to eject the frozen cubes therefrom from one side of the mold. As fluid under pressure is admitted to the cavities 3 through the passageway 22 the more flexible sides of the molds 12 will first flex, while the opposite sides of the molds will be held relatively rigid by ribs (not shown) which are described in more detail in my prior co-pending application. As the molds are further inverted the ice cubes will still adhere to the molds and will be in a position to drop to the container. Thereafter continued application of pressure within the concave cavities 3 on the underside of the flexible mold members 12 will flex the wall portion of the molds 12 adjacent the ribs to thus stretch the thin wall portion adjacent the ribs more than the rest of the mold to normally thereby release the ice cubes to cause them to fall to their container (not shown).

The scavenger bar device 10 which forms the subject of the present invention comprises a scavenger bar 16 and a pivot bar 17 carried in spaced holes 18 in arms 19 and 20. Pivot bar 17 is mounted for rotational movement within fixed support brackets 21, which are integral with or rigidly connected to the ice cube tray or platform 15.

The illustrated embodiment of applicant's invention is shown as including a thermal element housing, generally designated by the numeral 23, having a fluid passageway 24 in a boss 25 in which the boss 25 is connected to and is in open fluid communication with the fluid passageway 22, in the ice tray 15, by any suitable means, and is tightly sealed thereto by an O-ring 27 in a grooved portion 28 of the boss 25.

An end cap 29 is shown as being threadedly mounted in the housing 23 and as having a grooved end portion 30 therein arranged to carry an O-ring seal 31. The end cap 29 and the inner walls of the housing 23 are shown as defining a chamber 32 arranged to accept a thermal element, generally designated by the numeral 33, therein. The thermal element 33 may be of any suitable form but is preferably of the type containing a temperature sensing material having a substantial change in volume at the desired operating range of the system in which it is used. A thermal element of the type shown and described in the Vernet Patent No. 2,368,181 may be used. This type of thermal element has the advantage of compactness and simplicity, as well as its relatively high power and long range of extensible movement of a power member or piston 34 of the thermal element from its cylinder 35. In such types of thermal elements, a thermal medium (not shown) in the form of a fusible thermally expansible material is contained within a casing 36 of the thermal element 33 and reacts against a membrane or deformable member (not shown), to extend the power member or piston 34 with respect to the cylinder 35 as the thermal medium reaches its fusion point.

The thermal element 33 is held rigidly in place by abutment of the casing 36 against end cap 29 and by abutment of the clamping ring 37 of the thermal element 33 against an O-ring 38 sealed tightly to a flanged portion 39 of the housing 26. A spring chamber 42 of the housing 23 is shown as containing a spring 43 abutting, at one end, an end portion 44 of the housing 23 and, at the other end, as abutting a flanged portion 45 of a sleeve 46. The sleeve 46 is slidably guided on the cylinder 35 and is shown as abutting, on its under end surface, a collar 47 welded, pressed, or otherwise rigidly secured to the piston 34 and as having a central aperture 48 therein through which the piston 34 slidably protrudes.

A connecting yoke 49 is shown as being threadedly mounted on a reduced threaded end portion 50 of the piston 34 and as being rotatably movably secured to spacer arm 20 as by means of a pin 51 which extends through an elongated slot 54 in the arm 20.

In operation the scavenger bar device 10 functions as follows: The reservoir and metering device 11 is actuated in the manner hereinbefore described to cause ejector fluid to flow into the fluid passageway 22 in the ice cube tray 15. This fluid is pressurized and is sufficient to invert the flexible molds 12. Simultaneously, ejector fluid enters the chamber 32 through the passageway 24. The warmth of the fluid, which is at normal household temperature, is sufficient to cause fusion of the thermally expansible material within the thermal element 33 and extensible movement of the piston 34. The extensible movement of the piston 34 causes rotatable movement of the spacer arms 19 and 20 about the pivot bar 17 thus bringing the scavenger bar 16 into engagement with any ice cubes which may be sticking to the inverted molds thus pushing them off or at least causing them to be pushed off since the scavenger bar in this position lies in the path of their return movement. Ejector fluid is then withdrawn from chambers 22 and 32 by the metering device and reservoir 11 in the manner hereinbefore described and the ambient air temperature around the thermal sensitive element 33 cools the element to retractably move the piston 34 within the casing 35 to return the scavanger bar to the position illustrated in Figs. 1 and 5 to complete the cycle.

In the embodiment of the invention illustrated in Figure 5, the switch 145 is shown as being mounted in the upper end portion of the cylindrical bracket 165 which is attached by screws 166 to the upper end portion 44 of the housing 23. The actuating lever 167 which is rockably mounted in the leg 168 and which engages the switch arm 146 in the manner illustrated in Figure 6 operatively abuts, at one end thereof, a link 169 which forms an extension of the yoke 49 illustrated in Figure 2. The cylindrical housing 165 is, of course, suitably apertured as at 170 to receive the spacer arm 20 therethrough to permit relative freedom of movement of the spacer bar 20 about the pivot bar 17. It will further be apparent that a spider 171 having a central aperture 172 therein is positioned within the upper end portion of the housing 165 to receive the upper end portion of the link 169 within the central aperture 172 to provide a means for guiding the link 169 and to position the link in operative relation with respect to the actuating lever 167.

Obviously, in this embodiment of the invention only the thermally responsive element 33 is necessitated and there is no need for a second thermal element such as the thermally responsive element 140 illustrated in Figure 6.

With reference to the foregoing description and the detailed drawings appended thereto it will be noted that applicant has provided a novel means for insuring that the frozen cubes will be ejected from the flexible molds after the inversion thereof, and that only one thermal element need be utilized for effecting operation of the combination fluid metering device and ejector fluid reservoir and the scavenger bar device which forms the subject of the present invention.

It will herein be understood that these embodiments of the invention have been used for illustrative purposes only and that various modifications and variations in the present invention may be effected without departing from the spirit and scope of the novel concepts thereof.

I claim as my invention:

1. An automatic ice cube maker comprising a plurality of flexible invertible molds for receiving and holding water, a support carrying said molds, a scavenger bar mounted on said support for rotatable movement above said molds, means for turning said molds inside out to discharge frozen ice cubes therein, and means for moving said scavenger bar into the path of return movement of any cubes to engage and dislodge any ice cube sticking to a mold.

2. An automatic ice cube maker comprising a plurality of flexible invertible molds for receiving and holding water, a support carrying said molds, a rocker bar mounted on said support for rocking movement above said molds, means for turning said molds inside out to discharge frozen ice cubes therefrom, and means for moving said rocker bar into the path of return movement of any cubes to engage and dislodge any ice cube sticking to a mold.

3. An automatic ice cube maker comprising a plurality of flexible invertible molds for receiving and holding water, a support carrying said molds, a scavenger bar mounted on said support for rotatable movement above said molds, thermally actuatable means for turning said molds inside out to discharge frozen ice cubes therefrom, said thermally actuatable means being responsive to the temperature within said molds, and means for rotatably moving said scavenger bar into the path of return movement of any cubes sticking to said molds to engage and dislodge any sticking cubes.

4. An automatic ice cube maker comprising a plurality of flexible invertible molds for receiving and holding water, a support carrying said molds, a scavenger bar mounted on said support for pushing movement above said molds, means for intermittently delivering a metered quantity of water to said molds, thermally actuatable means for turning said molds inside out to discharge frozen ice cubes therefrom, said thermally actuatable means being responsive to the temperature within said molds, and means for moving said scavenger bar into the path of return movement of any cubes sticking to said molds upon inversion of said molds to engage and dislodge any cubes sticking to said molds.

5. An automatic ice cube maker comprising a plurality of flexible invertible molds for receiving and holding water, a support carrying said molds, a scavenger bar mounted on said support for rotatable movement above said molds, means for intermittently delivering a metered quantity of water to said molds at the end of each ice cube ejection stage of the cycle of operation of said ice cube maker, thermally actuatable means for turning said molds inside out to discharge frozen ice cubes therefrom, means formed integrally with said molds for directing ice cubes ejected from said mold to one side of said support, said thermally actuatable means being responsive to the temperature within said molds, and means for moving said scavenger bar into the path of return movement of any cubes sticking to said molds upon inversion of said molds to engage and dislodge any cubes sticking to said molds.

6. In an automatic ice cube maker a mold support, a plurality of invertible molds secured to said support for receiving and containing water to be frozen into ice cubes, means for inverting said molds to eject ice cubes therefrom and subsequently returning said molds to a liquid receiving position, thermal responsive mechanical means for engaging and dislodging any cubes sticking to said molds upon return movement of said molds, said thermal means being actuated as a function of the temperature within said molds.

7. In an automatic ice maker, a mold support, invertible flexible molds mounted on said support, metering means for intermittently filling said molds with a measured volume of water, fluid means operated by said metering means for inverting said molds, means hysteretically actuatable by the temperature of said fluid means for engaging and dislodging any ice cubes sticking to said molds upon return movement thereof.

8. In an automatic ice maker, a mold support, invertible flexible molds mounted on said support, metering means for filling said molds with a measured volume of water, fluid means for inverting said molds, a scavenger bar movably mounted on said support to engage and dislodge any ice cubes sticking to said molds upon return movement thereof, a thermal responsive power element operatively connected to said scavenger bar for initiating the operative movement of said scavenger bar in response to temperature changes of said fluid means.

9. In an automatic ice maker comprising a mold support having invertible flexible molds mounted thereon, said molds being arranged to receive and contain water to be frozen into ice cubes, fluid actuatable means for inverting said molds, scavenger means for engaging and separating any sticking ice cubes from their respective molds when said molds are returned to their normal position and thermal sensitive power means actuatable by the temperature of said fluid means for actuating said scavenger means.

10. In an automatic ice maker, a supporting tray having a plurality of cavities therein, a fluid passageway extending along said tray and opening to said cavities, a flexible mold within each of said cavities invertable to eject frozen ice cubes therefrom from one side of said tray, a metering device for metering water to fill said molds, a reservoir for ejector fluid having fluid communication with said passageway to supply fluid to said cavities to invert said molds, a diaphragm forming one wall of said reservoir and said metering device movable in one direction to decrease the volume of said reservoir to force ejector fluid therefrom by the pressure of water filling said metering device and in another direction to increase the volume of said reservoir to withdraw ejector fluid from said cavities and to force a measured volume of water from said metering device, a fill delay container in fluid communication with said metering device operable to delay the filling of said molds while said molds are in the inverted position, solenoid actuated valve means at the outlet from said metering device normally biased into the closed position, second solenoid actuated valve means at the outlet from said container normally biased into the open position, and means for simultaneously energizing the solenoids cooperable with each of said valve means to open said first mentioned valve means and close said second valve means, a scavenger bar mounted on said tray for rotatable movement above said molds, and means for moving said scavenger bar into the path of return movement of any cubes sticking to said molds to engage and dislodge the sticking cubes.

11. In an automatic ice maker, a supporting tray having a plurality of cavities therein, a fluid passageway extending along said tray and opening to said cavities, a flexible mold within each of said cavities invertable to eject frozen ice cubes therefrom from one side of said tray, a metering device for metering water to fill said molds, a reservoir for ejector fluid having fluid communication with said passageway to supply fluid to said cavities to invert said molds, a diaphragm forming one wall of said reservoir and said metering device movable in one direction to decrease the volume of said reservoir to force ejector fluid therefrom by the pressure of water filling said metering device and in another direction to increase the volume of said reservoir to withdraw ejector fluid from said cavities and to force a measured volume of water from said metering device, a fill delay container in fluid communication with said metering device operable to delay the filling of said molds while said molds are in the inverted position, solenoid actuated valve means at the outlet from said metering device normally biased into the closed position, second solenoid actuated valve means at the outlet from said container normally biased into the open position, and means for simultaneously energizing the solenoids cooperable with each of said valve means to open said first mentioned valve means and close said second valve means, thermal responsive mechanical means for engaging and dislodging any cubes sticking to said molds upon return movement of said molds, said thermal means being actuated as a function of the temperature within said cavities.

12. In an automatic ice maker, comprising a tray, invertible molds secured to said tray, metering means for filling said molds with a measured volume of water, fluid means operated by the fluid pressure of said metering means for supplying pressure to invert said molds, means for engaging and dislodging any ice cubes sticking to said molds upon the return movement of said molds including a scavenger bar, a pivot bar, and pivot arms functioning to hold said scavenger bar and said pivot bar in spaced relation from one another, a thermal element responsive to the temperature of said fluid means, a piston extensibly movable with respect to said thermal element and operatively connected to one of said pivot arms, so arranged that extensible movement of said piston causes rotational movement of said scavenger bar about the axis of said pivot bar causing said scavenger bar to move into the path of return movement of any ice cubes sticking to said molds upon return movement of said molds.

13. In an automatic ice-making apparatus, a mold support, an invertible mold carried by said support for receiving and holding water to be frozen into ice blocks, means for inverting said mold to release said blocks, and means for engaging and dislodging any ice blocks sticking to said mold upon inversion thereof, comprising a power-driven movable member and means moving said member into position for engaging said block upon inversion of said mold.

References Cited in the file of this patent
UNITED STATES PATENTS

| | | |
|---|---|---|
| 2,259,066 | Gaston | Oct. 14, 1941 |
| 2,599,972 | Buchanan | June 10, 1952 |
| 2,770,102 | Roedter | Nov. 13, 1956 |
| 2,776,546 | Clark | Jan. 8, 1957 |